(12) United States Patent
Donofrio et al.

(10) Patent No.: US 10,668,864 B2
(45) Date of Patent: Jun. 2, 2020

(54) AUTOMOBILE ROOF CARGO MOUNTING DEVICE

(71) Applicant: PGP Holdings, LLC, Fairfield, CT (US)

(72) Inventors: Robert John Donofrio, Fairfield, CT (US); John Gregory Robinson, Stratford, CT (US)

(73) Assignee: PGP Holdings, LLC, Fairfield, CT (US)

( * ) Notice: Subject to any disclaimer, the term of this patent is extended or adjusted under 35 U.S.C. 154(b) by 0 days.

(21) Appl. No.: 16/208,346

(22) Filed: Dec. 3, 2018

(65) Prior Publication Data

US 2019/0168679 A1 Jun. 6, 2019

Related U.S. Application Data

(63) Continuation of application No. 15/096,055, filed on Apr. 11, 2016, now abandoned.

(60) Provisional application No. 62/146,300, filed on Apr. 12, 2015.

(51) Int. Cl.
*B60R 9/00* (2006.01)
*B60R 9/048* (2006.01)
*B60R 9/05* (2006.01)

(52) U.S. Cl.
CPC ............... *B60R 9/00* (2013.01); *B60R 9/048* (2013.01); *B60R 9/05* (2013.01)

(58) Field of Classification Search
CPC ............. B60R 9/00; B60R 9/048; B60R 9/05
USPC ........ 224/539, 339, 318, 324, 328, 329, 330
See application file for complete search history.

(56) References Cited

U.S. PATENT DOCUMENTS

| | | | |
|---|---|---|---|
| 2,454,608 A | 11/1948 | Meyerdick | |
| 2,781,811 A | 2/1957 | Dilar | |
| 3,514,023 A | 5/1970 | Brooks | |
| 3,642,679 A * | 2/1972 | Young | C08L 45/02 383/32 |
| 4,054,166 A | 10/1977 | Burke | |
| 4,247,026 A | 1/1981 | Heifner | |
| 4,799,520 A | 1/1989 | Blackburn | |
| 5,288,003 A | 2/1994 | MacDonald | |
| 5,291,999 A * | 3/1994 | Phair | A47G 33/045 206/423 |
| D349,469 S | 8/1994 | Mitchell | |

(Continued)

FOREIGN PATENT DOCUMENTS

| GB | 1177374 | 1/1970 |
|---|---|---|
| KR | 20140017919 | 2/2014 |

*Primary Examiner* — Justin M Larson
*Assistant Examiner* — Lester L Vanterpool
(74) *Attorney, Agent, or Firm* — Cesari and McKenna, LLP

(57) ABSTRACT

The embodiments herein are directed to a reusable frameless vehicle roof-top carrier configured, dimensioned and arranged to securely mount and carry cargo loads having a size and shape similar to cut evergreen trees, while protecting the vehicle finish and cargo from damage. The reusable vehicle roof-top carrier is trapezoidal shaped to conveniently bind and condense branches of the tree, while catching sap drippings. Illustratively, the vehicle roof-top carrier is made from a tear-resistant fabric and includes a non-tacky non-slip surface placed in slip-resistant contact with the roof of the vehicle so as to prevent slippage (i.e., movement) of the tree during transport.

20 Claims, 5 Drawing Sheets

(56) References Cited

U.S. PATENT DOCUMENTS

| | | | |
|---|---|---|---|
| 5,590,775 A * | 1/1997 | Moore | A47G 33/045 |
| | | | 206/423 |
| 5,746,317 A | 5/1998 | Turner | |
| 5,947,354 A * | 9/1999 | Williams | B60R 9/04 |
| | | | 224/314 |
| 6,032,916 A | 3/2000 | Holliday | |
| 6,209,768 B1 | 4/2001 | Boaz | |
| 6,244,482 B1 * | 6/2001 | Gyarmaty | B60R 9/055 |
| | | | 224/318 |
| 6,257,470 B1 | 7/2001 | Schaefer | |
| 6,332,713 B1 | 12/2001 | Cohen | |
| D469,609 S | 2/2003 | Hoffman | |
| 6,889,882 B1 | 5/2005 | Leep | |
| 7,246,988 B1 | 7/2007 | Zambetti | |
| 8,075,185 B2 | 12/2011 | Hecht et al. | |
| 9,578,814 B2 | 2/2017 | Belschner | |
| 2005/0199665 A1 | 9/2005 | Plzak | |
| 2006/0043130 A1 | 3/2006 | Dabrowski | |
| 2007/0227925 A1 * | 10/2007 | Westrate | A47G 33/045 |
| | | | 206/423 |
| 2008/0185307 A1 | 8/2008 | Hecht et al. | |
| 2008/0257770 A1 | 10/2008 | Limber | |
| 2010/0127026 A1 | 5/2010 | Rhodes | |
| 2010/0158414 A1 * | 6/2010 | Michailidis | A45C 3/04 |
| | | | 383/12 |
| 2010/0263178 A1 | 10/2010 | Jensen | |
| 2012/0228894 A1 * | 9/2012 | Worden | B60R 13/011 |
| | | | 296/39.1 |
| 2012/0260421 A1 * | 10/2012 | DeGregorio | A47G 27/0206 |
| | | | 5/417 |

* cited by examiner

AUTOMOBILE ROOF CARGO MOUNTING DEVICE

CROSS-REFERENCE TO RELATED APPLICATIONS

The present application is a continuation of U.S. patent application Ser. No. 15/096,055, entitled AUTOMOBILE ROOF CARGO MOUNTING DEVICE, filed on Apr. 11, 2016 by Robert John Donofrio et al, and published as US Publication No. 2016/0318452 on Nov. 3, 2016 which claims the benefit of U.S. Provisional Patent Application Ser. No. 62/146,300, which was filed on Apr. 12, 2015, by Robert John Donofrio, et al., for AUTOMOBILE ROOF CARGO MOUNTING DEVICE, which is hereby incorporated by reference.

BACKGROUND

Technical Field

The present disclosure relates to automobile roof mounts and, more specifically, to roof mounts for carrying cargo loads having a size and shape similar to cut evergreen trees (e.g., conifers).

Background Information

Securing and transport via automobile of cut evergreen trees, commonly sold and procured during the Christmas holiday season, is a timely and difficult procedure that presents the possibility of damage to the tree, the automobile, and any surrounding vehicles in the area. Conventional roof mount carrying systems for automobiles are designed to carry generic loads such as luggage. Some carriers are designed for specific items such as kayaks, which require unique design features to ensure that the load is easily and safely secured to the automobile. The use of a generic roof mount system does not address the unique needs of carrying loads such as cut evergreen trees. Generally the securing and transport of a cut evergreen tree is done without the assistance or use of a suitable mount. Typically the securing of a cut evergreen tree before transport requires binding the tree branches with twine to flatten and secure them against the trunk of the automobile or on the roof. Once prepared, the cut evergreen tree is commonly placed directly onto the automobile's roof and tied down using some form of disposable twine. This requires knowledge of knot tying and potentially other devices to cut the twine, which if performed improperly may fail to adequately secure the tree to the automobile. Carrying a cut evergreen tree in this manner is potentially dangerous at high speeds due to movement and possible release of the tree. Moreover, this manner of transport may cause damage to a finish of the vehicle because of scratching and exposure to sap, as well as damage to the tree due to wind exposure while in transit. Finally, dismounting of the cut evergreen tree is difficult and unwieldy due to the shape, size and weight of a typical tree.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments herein are directed to a reusable frameless vehicle roof-top carrier configured, dimensioned and arranged to securely mount and carry cargo loads having a size and shape similar to cut evergreen trees, while protecting a finish of the vehicle and cargo from damage. The reusable vehicle roof-top carrier is trapezoidal shaped to conveniently bind and condense branches of the tree, while catching sap drippings. Illustratively, the vehicle roof-top carrier is made from a tear-resistant fabric (e.g., rip-stop nylon) and includes a non-tacky non-slip surface placed in slip-resistant contact with the roof of the vehicle so as to prevent slippage (i.e., movement) of the tree during transport. The roof-top carrier includes two straps each passing through a loop in the roof-top carrier and secured to the vehicle, in an embodiment, using hooks in a door frame of the vehicle and, in an alternative embodiment, using connectors to attach ends of the straps passing through the passenger compartment of the vehicle. A distance between the two loops is generally no less than 16 inches and no larger than a size of a door of a two-door passenger automobile. In this manner, the tree may be securely connected to the vehicle for transport at highway speed (e.g., 55+ MPH) without the tree slipping or moving from the roof of the vehicle until manually released. Illustratively, a first of the two loops is located approximately 12 inches from a leading edge of the roof-top carrier in a direction of vehicle travel, so as to be practicable for connection to vehicles having a wide variety of roof curvatures while maintaining sufficient downward force against the roof of the vehicle to thereby prevent a countervailing aerodynamic lift force from causing the tree to slip.

Description

Figure 1:
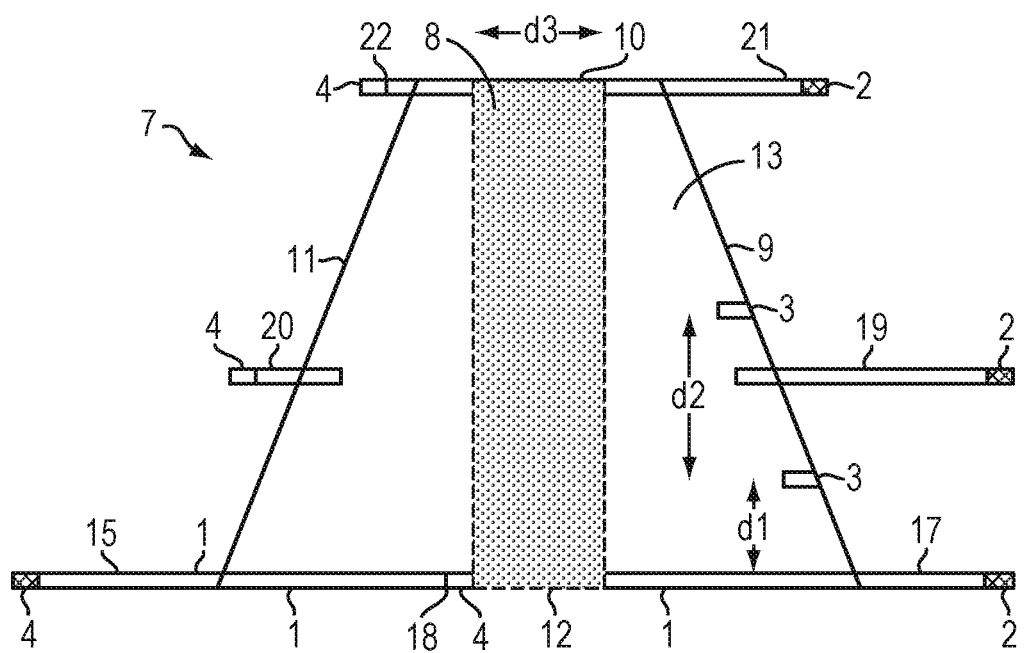
FIG. 1 is a view of an exterior side of an embodiment of a vehicle roof-top carrier.
Figure 2:
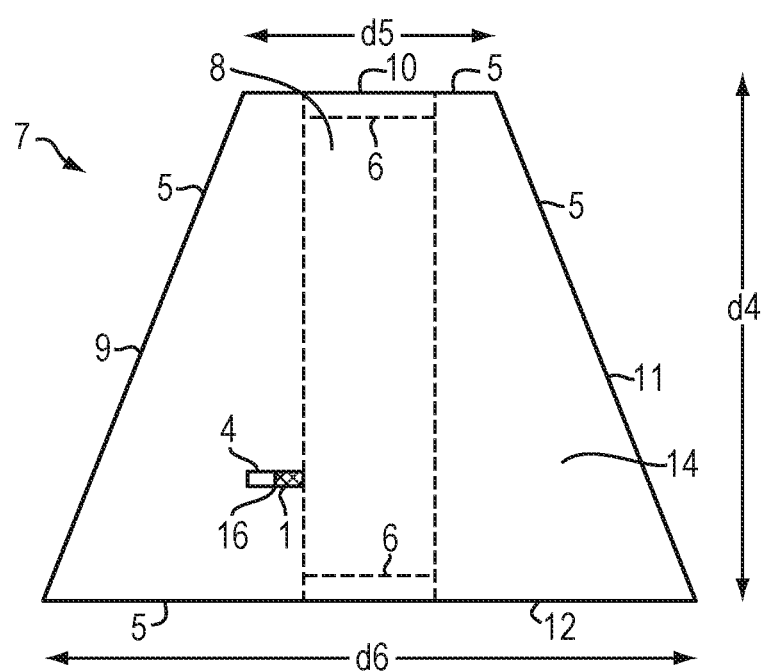
FIG. 2 is a view of an interior side of the embodiment of the vehicle roof-top carrier.

FIGS. 1 and 2 are views of exterior and interior sides respectively of an embodiment of a vehicle roof-top carrier. Illustratively, the vehicle roof-top carrier 7 is constructed of a single piece of tear-resistance fabric (e.g., rip-stop nylon, canvas and other natural and synthetic materials) in a trapezoidal shape, where an interior side 14 is configured, dimensioned and arranged to contact a cargo load and an exterior side 13 is configured, dimensioned and arranged to contact a vehicle roof. In an embodiment, a trailing edge 10 is smaller in length d5 than a leading edge 12, such that the trailing edge 10 is approximately one-third to one-half a length d6 of the leading edge 12. The outer edges 9, 11 are cut at an angle tapering from the leading edge 12 to the trailing edge 10, thereby forming the trapezoidal shape of the roof-top carrier. Each edge 9, 10, 11, 12 is rolled and sewn approximately one quarter inch to prevent tearing. The leading edge 12 is approximately 4 to 6 feet (i.e., 48 to 72 inches) in length and a length d4 from the leading edge to the trailing edge is approximately 5 feet (60 inches).

Illustratively, the length of the leading edge 12 is sufficiently long to wrap around the cargo load, e.g., a width of a cut evergreen tree (typically a conifer) ranging in size from 4 to 14 feet tall. The leading edge 12 wraps around a bottom of the load (e.g., towards roots of the tree), while the trailing edge 10 wraps around the load towards a top of the load.

In an embodiment, the roof-top carrier has multiple straps 15,16,17,18,19,20,21,22 connected on the exterior side 13 and interior side 14 of the roof-top carrier. The straps 15,16,17,18,19,20,21,22 have both male connectors 2 and female connectors 4 that connect the straps together in pairs in a manner to secure and condense the load, such as an unbaled cut evergreen tree. The straps 15,16,17,18,19,20, 21,22 are attached (e.g., sewn and/or glued) along a sufficient length to the fabric (on the interior and exterior) to ensure that they can maintain about a 100 lb load (e.g., an approximate weight of a 14 foot cut evergreen tree), without tearing the edges 9,10,11,12. As noted previously, the edges may be rolled to enhance resistance to tearing. The straps 15,16,17,18,19,20,21,22 are also paired and distributed in a manner so as to permit wrapping around the load, wherein the outer edges 9,11 cross over each other towards the leading edge 12 thereby creating a protective barrier over a portion of the load nearest to the leading edge 12.

The exterior side 13 of the roof-top carrier has a strip of non-tacky, non-slip material 8 attached to the exterior side 13 configured, dimensioned and arranged for slip-resistant contact with the roof of the vehicle and to prevent the roof-top carrier from easily sliding or shifting when transporting the load. The non-slip surface may be a spray-on or single or multiple sheets of material (e.g., rubberized vinyl) that creates a non-slip surface feature. In an embodiment, the non-slip coating 8 is applied to the fabric perpendicular to the leading and trailing edges approximately in a center of the fabric. The non-slip coating has a width d3 approximately no more than 12 inches and no less than 6 inches so as to accommodate a load diameter of 3 feet (e.g., a diameter of an unbaled evergreen tree condensed in the roof-top carrier) while maintaining sufficient contact with the roof to prevent slippage. Note that the non-slip coating is not tacky, so as to avoid sticking to the vehicle (to prevent damage to a finish of the vehicle), but only to prevent slippage while carrying the load at highway speeds.

Figure 3:
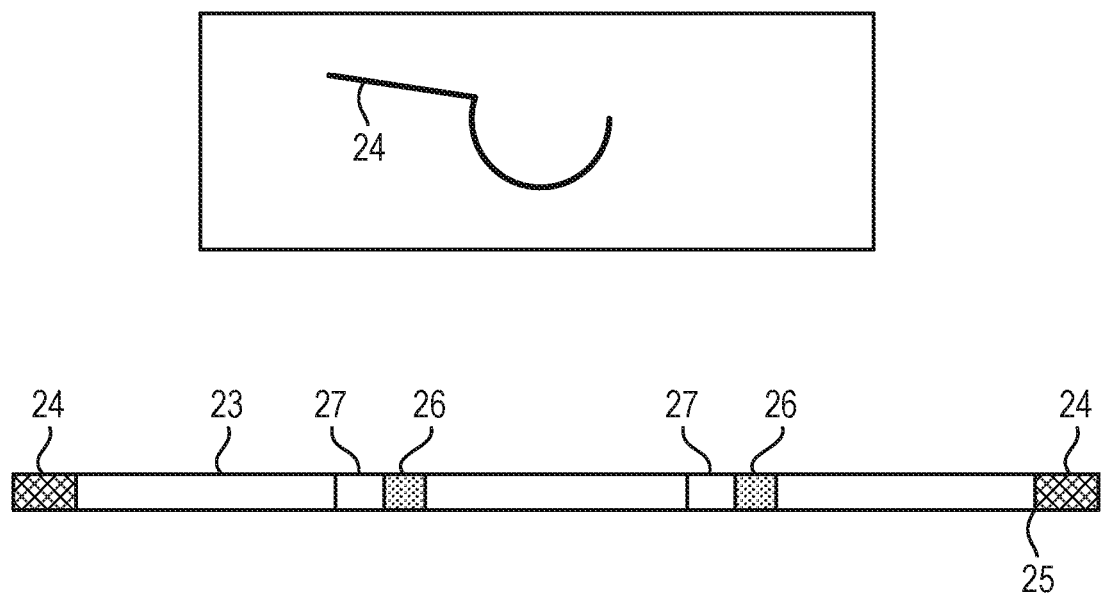
FIG. 3 is a view an embodiment of a strapping and hook system for securing the vehicle roof-top carrier.

FIG. 3 is a view an embodiment of a strapping and hook system for securing the vehicle roof-top carrier. Illustratively, a bracket device allows for a hook mounting system 23 to be securely attached to the exterior side 13 of the roof-top carrier without being sewn or otherwise rigidly attached to the roof-top carrier 7. The hook mounting system 23 may slide freely within the bracket device. The bracket device may be made of a fabric sleeve or eye loop or similarly secured device mounted to the exterior side 13 in a manner that allows the hook mounting system to securely, but with free movement, be attached to the roof-top carrier 7. The hook mounting system 23 is made of a strapping material 25, with a hook 24 attached to each end. Between the two ends of hook mounting system 23 are at least one or two buckles that include male 26 and female 27 connectors. The connectors may be configured, dimensioned and arranged to assist with mounting and removing of the roof-top carrier to and from the vehicle. The strapping 25 and the male 26 and female 27 buckles are of sufficient strength to safely mount the load and remain secure while transporting the load at highway speed. In an embodiment, the hook 24 is configured, dimensioned and arranged of a sufficient angle and material, such as hardened metal or carbon fiber or the like, to connect securely to the interior of the vehicle door frame and not break, slide, or release from that door frame when the door is shut and while the vehicle is traveling. Further, the angle and shape of the hook may be configured to provide a universal fit to most conventional passenger vehicles.

Figure 4:
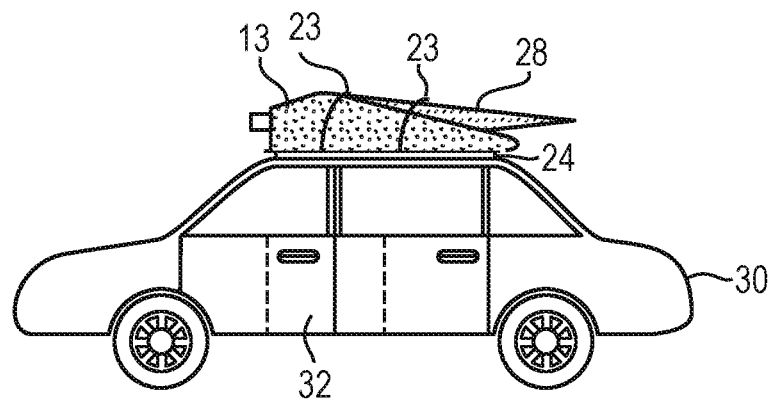
FIG. 4 is a side view of the vehicle roof-top carrier mounted on a vehicle.
Figure 5:
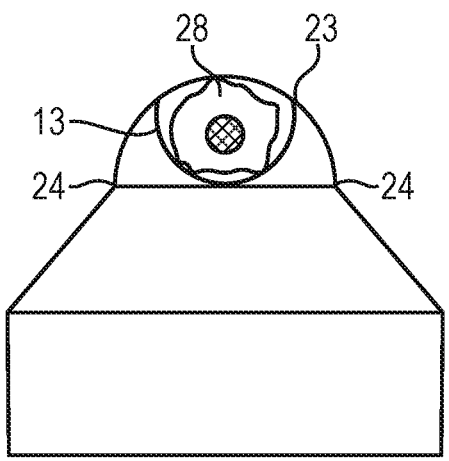
FIG. 5 is front view of the vehicle roof-top carrier mount on the vehicle.

FIGS. 4 and 5 are side and front views respectively of the vehicle roof-top carrier mounted on the vehicle. Illustratively, the hook mounting system 23 crosses over the exterior side 13 and attaches to the vehicle door frames using the hooks 24.

Figure 6:
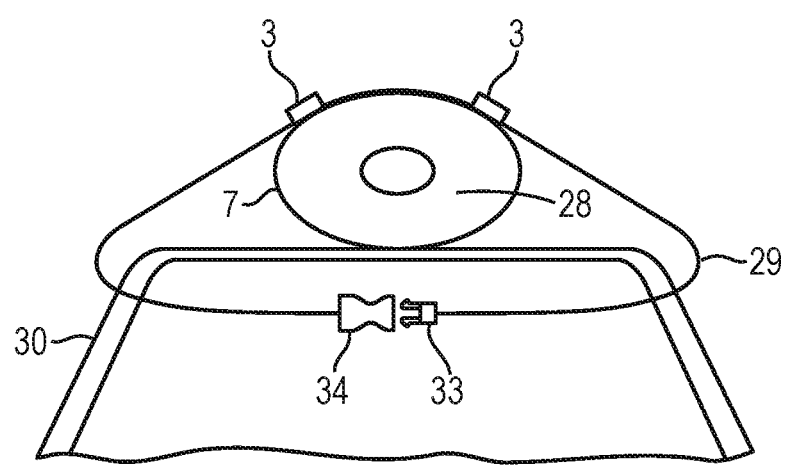
FIG. 6 is a view of an embodiment of the vehicle roof-top carrier mounted on the vehicle.

FIG. 6 is a view of an embodiment of the vehicle roof-top carrier mounted on the vehicle. Illustratively, the straps 15 and 21 are used to secure the load 28 to the roof-top carrier 7, while one or more straps 29 through loops 3 are used to hold the roof-top carrier on the roof of the vehicle 30. The loops 3 on the exterior side 13 are approximately 3 inches by 3 inches in size, so as to allow an apex of the carried tree 28 in the fabric to appear approximately vertical and to afford sufficient downward force to prevent slippage of the load when traveling at highway speed. That is, tensions on the straps 29 provide a downward force on the non-slip strip against a countervailing aerodynamic force sufficient to prevent slippage when the vehicle is traveling. Each strap 29 is sufficiently thin (about 1-2 mm) so as to slip between rubber seals of the vehicle door and the vehicle door frame. The straps may have male/female connectors 33, 34 to attach to each other inside the vehicle (e.g., through a passenger compartment of the vehicle). The connectors 33, 34 may be made from a sufficiently strong plastic or plastic coated metal to avoid scratches to the finish of the vehicle. Notably, a distance between the loops d3 is approximately less than the length of a conventional 2-door passenger vehicle door (e.g., 16 inches), so that both straps may pass through such a vehicle door, which is larger than a typical door of a conventional 4-door passenger vehicle. A distance d2 from the leading edge 12 to a first loop 3 is approximately 12 inches to accommodate a wide variety of vehicle roof curvatures while providing sufficient downward force against countervailing aerodynamic lift created during transport at highway speeds (e.g., greater than 55 MPH). Note that if the distance d2 from the leading edge to the first loop is too long, the aerodynamic force may tear the fabric for a load of sufficient weight.

Illustratively, the leading edge strap has two equal length parts 1 each having a male connector 2. A first female connector 4 may be located abutting the leading edge approximately at one edge of the non-slip coating on the exterior side of the roof-top carrier to which the strap 15 is sewn. A second female connector 16 is located on the interior side of the fabric. The tree is secured in the fabric on the leading edge by looping a first part of the strap 15 around the tree and connecting the end to the connector 16 on the interior side. A second part 17 of the strap may be looped around the load and roof-top carrier in the opposite direction and attached to the connector 18 on the exterior side.

The advantages of the present roof-top carrier include, without limitation, a convenient and easy way in which to wrap a cut evergreen tree and secure it safely to the top of an automobile. The roof-top carrier protects the cut evergreen tree, while protecting the finish of vehicle from scratching and sap damage. The roof-top carrier is easy to use as it is small and convenient enough to typically require one person to secure the load and mount it to the automobile roof, as well as remove the load when transport is complete. Further this roof-top carrier makes the transport of the load or cut evergreen tree easier before and after mounting to the roof of a vehicle. The use of this device is primarily for the transport of loads of a similar size and shape of a cut evergreen tree, but is not limited to a specific use case.

The foregoing description has been directed to specific embodiments. It will be apparent, however, that other variations and modifications may be made to the described embodiments, with the attainment of some or all of their advantages. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A vehicle roof-top carrier comprising:
   a trapezoidal tear-resistant fabric having leading and trailing edges;
   a first strap attached to an interior side of the fabric, the strap having a first connector at one end;
   a second connector attached to an exterior side of the fabric for mating with the first connector of the strap such that the interior side of the fabric contacts a cargo load, wherein the cargo load is a tree;
   a strip of non-slip material included on the exterior side of the fabric perpendicular to the leading and trailing edges in a center of the fabric, the strip extending from the leading edge to the trailing edge of the fabric; and
   second and third straps configured to pass through a plurality of loops in the exterior side of the fabric such that the loops are at a vertical apex when the cargo load is wrapped in the fabric, a first loop at a predetermined first distance from the leading edge to provide a downward force on the non-slip strip against a countervailing aerodynamic force sufficient to prevent slippage when the roof-top carrier is mounted on a traveling vehicle.

2. The vehicle roof-top carrier of claim 1 wherein all edges of the fabric have rolled and sewn seams.

3. The vehicle roof-top carrier of claim 1 wherein the non-slip material is non-tacky.

4. The vehicle roof-top carrier of claim 1 wherein the tree is a conifer greater than 12 ft in length.

5. The vehicle roof-topper carrier of claim 1 wherein the predetermined first distance is no more than 12 inches from the leading edge.

6. The vehicle roof-top carrier of claim 1 wherein the second and third straps are configured and dimensioned to secure the roof-top carrier to the vehicle through two front doors of the vehicle, and wherein a second distance between the second and third straps is at least 16 inches.

7. The vehicle roof-top carrier of claim 1 wherein the strip has a width of at least 6 inches.

8. The vehicle roof-top carrier of claim 1 wherein the first and second connectors are plastic coated to prevent damage to a finish of the vehicle.

9. The vehicle roof-top carrier of claim 1 wherein the aerodynamic force is generated when the vehicle travels at speed greater than 55 miles per hour.

10. The vehicle roof-top carrier of claim 1 wherein the non-slip material is a spray-on rubberized vinyl.

11. The vehicle roof-top carrier of claim 1 wherein the non-slip material comprises:
    one or more sheets to create a non-slip surface feature on the exterior side of the fabric.

12. A vehicle roof-top carrier comprising:
    a tear-resistant fabric having a trapezoidal shape with leading and trailing edges, wherein all edges of the fabric have rolled and sewn seams;
    first a strap attached to an exterior side of the fabric and having a first connector at one end, the first strap configured to wrap around a cargo load and connect to a second connector attached to the interior side of the fabric;
    a second strap attached to interior side of the fabric and having a third connector at one end, the second strap configured to wrap around the cargo load and connect to fourth connect attached to the exterior side of the fabric, wherein the cargo load is a tree;
    a strip of non-slip material included on the exterior side of the fabric perpendicular to the leading and trailing edges in a center of the fabric, the strip extending from the leading edge to the trailing edge of the fabric; and
    third and fourth straps configured to pass through a plurality of loops in the exterior side of the fabric such that the loops are at a vertical apex when the cargo load is wrapped in the fabric, a first loop at a predetermined first distance from the leading edge to provide a downward force on the non-slip strip against a countervailing aerodynamic force sufficient to prevent slippage when the roof-top carrier is mounted on a traveling vehicle.

13. The vehicle roof-top carrier of claim 12 wherein the predetermined first distance is no more than 12 inches from the leading edge.

14. The vehicle roof-top carrier of claim 12 wherein the fabric is configured to prevent sap from the tree to damage a finish of the vehicle.

15. The vehicle roof-top carrier of claim 12 wherein the non-slip material is non-tacky.

16. The vehicle roof-top carrier of claim 12 wherein the leading edge has a length of at least 54 inches.

17. The vehicle roof-top carrier of claim 12 wherein a length of the trailing edge is one-third a length of the leading edge.

18. The vehicle roof-top carrier of claim 12 wherein the strip has a width of at least 6 inches.

19. The vehicle roof-top carrier of claim 1 wherein the first strap is configured to wrap around the cargo load in a direction opposition from that of the second strap configured to wrap around the cargo load.

20. A method comprising:
    wrapping a cargo load in a trapezoidal shaped fabric;
    looping a first strap around the cargo load in a first direction and attaching a first connector at an end of the first strap to a second connector attached to an exterior side of the fabric;
    looping a second strap around the cargo load in a second direction opposite of the first direction and attaching a third connector at an end of the second strap to a fourth connector attached to an interior side of the fabric;
    mounting the loaded fabric on a vehicle such that a non-slip strip in a center on the exterior side of the fabric contacts a roof of a vehicle;
    looping a third strap around a first plurality of loops on the exterior side of the fabric such that the first plurality of loops are at a vertical apex when the cargo load is wrapped in the fabric, the third strap passing through a passenger compartment of the vehicle; and
    looping a fourth strap around a second plurality of loops on the exterior side of the fabric such that the second plurality of loops are at a vertical apex when the cargo load is wrapped in the fabric, the fourth strap passing through the passenger compartment of the vehicle, wherein tensions in the third and fourth straps provide a downward force on the non-slip strip against a countervailing aerodynamic force sufficient to prevent slippage when the vehicle is traveling.

* * * * *